(12) United States Patent
Chhabra et al.

(10) Patent No.: US 9,374,775 B2
(45) Date of Patent: *Jun. 21, 2016

(54) METHOD AND APPARATUS FOR PROVIDING LOCATION-AWARE WI-FI ACCESS

(71) Applicant: MARVELL WORLD TRADE LTD., St. Michael (BB)

(72) Inventors: Kapil Chhabra, Milpitas, CA (US); Sandesh Goel, Fremont, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 93 days.

This patent is subject to a terminal disclaimer.

(21) Appl. No.: 14/094,698

(22) Filed: Dec. 2, 2013

(65) Prior Publication Data

US 2014/0092889 A1      Apr. 3, 2014

Related U.S. Application Data

(63) Continuation of application No. 12/437,312, filed on May 7, 2009, now Pat. No. 8,598,984.

(60) Provisional application No. 61/051,725, filed on May 9, 2008.

(51) Int. Cl.
| | | |
|---|---|---|
| *H04B 7/00* | (2006.01) | |
| *H04W 48/20* | (2009.01) | |
| *H04W 4/02* | (2009.01) | |
| *H04W 84/12* | (2009.01) | |

(52) U.S. Cl.
CPC .............. *H04W 48/20* (2013.01); *H04W 4/025* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2003/0118015 A1* | 6/2003 | Gunnarsson et al. ......... 370/389 |
| 2004/0203873 A1 | 10/2004 | Gray | |
| 2004/0203890 A1 | 10/2004 | Karaoguz et al. | |
| 2005/0030708 A1 | 2/2005 | Kawasaki et al. | |
| 2005/0058112 A1 | 3/2005 | Lahey et al. | |
| 2005/0143094 A1 | 6/2005 | Reed et al. | |
| 2006/0063560 A1 | 3/2006 | Herle | |

(Continued)

FOREIGN PATENT DOCUMENTS

| | | |
|---|---|---|
| CN | 1758796 A | 4/2006 |
| JP | 2004286460 A | 10/2004 |

(Continued)

OTHER PUBLICATIONS

International Search Report and Written Opinion in related PCT Application No. PCT/US2009/043204, dated Jul. 14, 2009 (9 pages).

(Continued)

*Primary Examiner* — Kwang B Yao
*Assistant Examiner* — Juvena Loo (57) ABSTRACT

Methods and systems for providing location-aware WiFi access for a portable device include receiving, at a mobile communication device, locations and ranges for a set of one or more WiFi access points from a location provider system. The mobile communication device uses the locations and ranges to determine whether to power on a WiFi transceiver, and to determine for which WiFi access points to scan if the WiFi transceiver is powered on.

29 Claims, 3 Drawing Sheets

(56) References Cited

U.S. PATENT DOCUMENTS

| | | | |
|---|---|---|---|
| 2006/0135150 A1* | 6/2006 | Oh | 455/425 |
| 2006/0234725 A1* | 10/2006 | Litwin | 455/456.2 |
| 2007/0060125 A1* | 3/2007 | Rahim | 455/436 |
| 2007/0167174 A1 | 7/2007 | Halcrow et al. | |
| 2007/0297355 A1 | 12/2007 | Jendbro et al. | |
| 2008/0181187 A1* | 7/2008 | Scott et al. | 370/338 |
| 2008/0305786 A1 | 12/2008 | Arumi et al. | |
| 2009/0098857 A1* | 4/2009 | De Atley | 455/411 |
| 2009/0124284 A1 | 5/2009 | Scherzer et al. | |
| 2009/0298496 A1 | 12/2009 | Pettersson et al. | |
| 2011/0317663 A1 | 12/2011 | Choi et al. | |
| 2012/0033594 A1 | 2/2012 | Kalbag | |
| 2012/0033653 A1 | 2/2012 | Kalbag | |
| 2013/0288708 A1 | 10/2013 | Alizadeh-Shabdiz | |

FOREIGN PATENT DOCUMENTS

| | | | |
|---|---|---|---|
| JP | 2004320473 A | 11/2004 | |
| JP | 2005057359 A | 3/2005 | |
| JP | 2006324915 A | 11/2006 | |
| WO | WO-2006/014439 A2 | 2/2006 | |
| WO | WO-2007014177 A1 | 2/2007 | |
| WO | WO-2007082913 A1 | 7/2007 | |

OTHER PUBLICATIONS

Fourth Office Action in related Chinese Application No. 200980115562.8, dated Sep. 19, 2014 (13 pages).

Office Action for CN200980115562.8, dated Jan. 23, 2013.

Notice of Reasons for Rejection for JP 2011-508685, dated Mar. 12, 2013.

Notice of Reasons for Rejection for JP 2011-508685, dated Oct. 1, 2013.

Office Action for CN200980115562.8 dated Oct. 8, 2013.

Third Office Action for corresponding Chinese Patent Application No. 200980115562.8, dated Apr. 1, 2014.

European Search Report for European Application No. 09743704.0-1857, dated Jan. 20, 2016 (7 pages).

* cited by examiner

METHOD AND APPARATUS FOR PROVIDING LOCATION-AWARE WI-FI ACCESS

CROSS-REFERENCE TO RELATED APPLICATIONS

This application is a continuation of U.S. patent application Ser. No. 12/437,312, now U.S. Pat. No. 8,598,984, entitled "Systems and Methods for Providing Location-Aware Wi-Fi Access for a Portable Device, filed May 7, 2009, which claims the benefit of U.S. Provisional Patent Application No. 61/051,725, filed May 9, 2008. Both of the applications referenced above are hereby incorporated herein by reference.

BACKGROUND

Certain mobile phone devices, which can be known also as "smart phones," can have wireless fidelity ("WiFi™") and global positioning system ("GPS") transceivers, in addition to long range communications technology, which is typically based upon the Global System for Mobile communications ("GSM") or code division multiple access ("CDMA") mobile phone standards. While GSM/CDMA are typically used to handle voice services, other technologies, such as Enhanced Data rates for GSM Evolution ("EDGE"), General Packet Radio Service ("GPRS"), and High Speed Downlink Packet Access ("HSDPA") are typically utilized for data services. However, it is generally preferable to use WiFi, a short-range technology, for voice and data services when possible because WiFi is typically available at lower cost than the above-mentioned technologies, and can provide higher throughput.

Since WiFi is a short range technology with potentially limited availability, users of conventional mobile phones can have difficulty utilizing the benefits that WiFi can provide. One way users can utilize WiFi technology is by manually searching for WiFi access, using trial and error at different locations in hopes of locating a WiFi access point. This can be disadvantageous because it requires user intervention, can be time consuming, and is generally inefficient unless the user knows of the location of WiFi access point. Another approach users of mobile phones can utilize is to maintain their WiFi transceivers in a continuous scan mode, where the device searches for available access points. While utilizing a continuous scan mode generally does not require much user intervention, the continuous scan mode can be highly power-intensive, and can reduce the battery life of the mobile phone.

SUMMARY OF THE DISCLOSURE

In one embodiment, a method for providing location-aware WiFi access for a mobile communication device includes receiving, at the mobile communication device, one or more respective locations and one or more respective wireless ranges for a first set of one or more WiFi access points from a WiFi location provider system, and determining, at the mobile communication device, whether a current location of the mobile communication device is within one or more respective wireless ranges of one or more WiFi access points in the first set of one or more WiFi access points. The method also includes, when it is determined i) that the current location of the mobile communication device is not within any wireless range of any of the WiFi access points in the first set, or ii) that the mobile communication device is moving at a velocity that meets a threshold, keeping a WiFi transceiver powered off. The method further includes, when it is determined i) that the current location of the mobile communication device is within one or more respective wireless ranges of one or more respective WiF access points in the first set, and ii) that the mobile communication device is moving at a velocity below the threshold, powering on the WiFi transceiver, and scanning, at the mobile communication device, for at least one WiFi access point in a second set of one or more WiFi access points, among the first set of one or more WiFi access points, within one or more respective wireless ranges of which the current location of the mobile communication device falls.

In another embodiment, a mobile communication device comprises a WiFi transceiver; and a processor. The processor is configured to: receive one or more respective locations and one or more respective wireless ranges for a first set of one or more WiFi access points from a WiFi location provider system, determine whether a current location of the mobile communication device is within one or more respective wireless ranges of one or more WiFi access points in the first set of one or more WiFi access points, when it is determined i) that the current location of the mobile communication device is not within any wireless range of any of the WiFi access points in the first set, or ii) that the mobile communication device is moving at a velocity that meets a threshold, keep the WiFi transceiver powered off, when it is determined i) that the current location of the mobile communication device is within one or more respective wireless ranges of one or more respective WiFi access points in the first set, and ii) that the mobile communication device is moving at a velocity below the threshold, power on the WiFi transceiver, and scan for at least one WiFi access point in a second set of one or more WiFi access points, among the first set of one or more WiFi access points, within one or more respective wireless ranges of which the current location of the mobile communication device falls.

In yet another embodiment, a tangible, non-transitory memory stores machine readable instructions that, when executed by a processor, cause the processor to: receive one or more respective locations and one or more respective wireless ranges for a first set of one or more WiFi access points from a WiFi location provider system; determine whether a current location of a mobile communication device is within one or more respective wireless ranges of one or more WiFi access points in the first set of one or more WiFi access points; when it is determined i) that the current location of the mobile communication device is not within any wireless range of any of the WiFi access points in the first set, or ii) that the mobile communication device is moving at a velocity that meets a threshold, keep a WiFi transceiver of a mobile communication device powered off; when it is determined i) that the current location of the mobile communication device is within one or more respective wireless ranges of one or more respective WiFi access points in the first set, and ii) that the mobile communication device is moving at a velocity below the threshold, power on the WiFi transceiver, and cause the mobile communication device to scan for at least one WiFi access point in a second set of one or more WiFi access points, among the first set of one or more WiFi access points, within one or more respective wireless ranges of which the current location of the mobile communication device falls.

DETAILED DESCRIPTION

The present invention relates to providing location-aware WiFi access for a portable device. The following description is presented to enable one of ordinary skill in the art to make and use the invention and is provided in the context of a patent application and its requirements. Various modifications to the embodiments and the generic principles and features described herein can be made. Thus, the present invention is not intended to be limited to the embodiments shown, but is to be accorded the widest scope consistent with the principles and features described herein.

Figure 1:
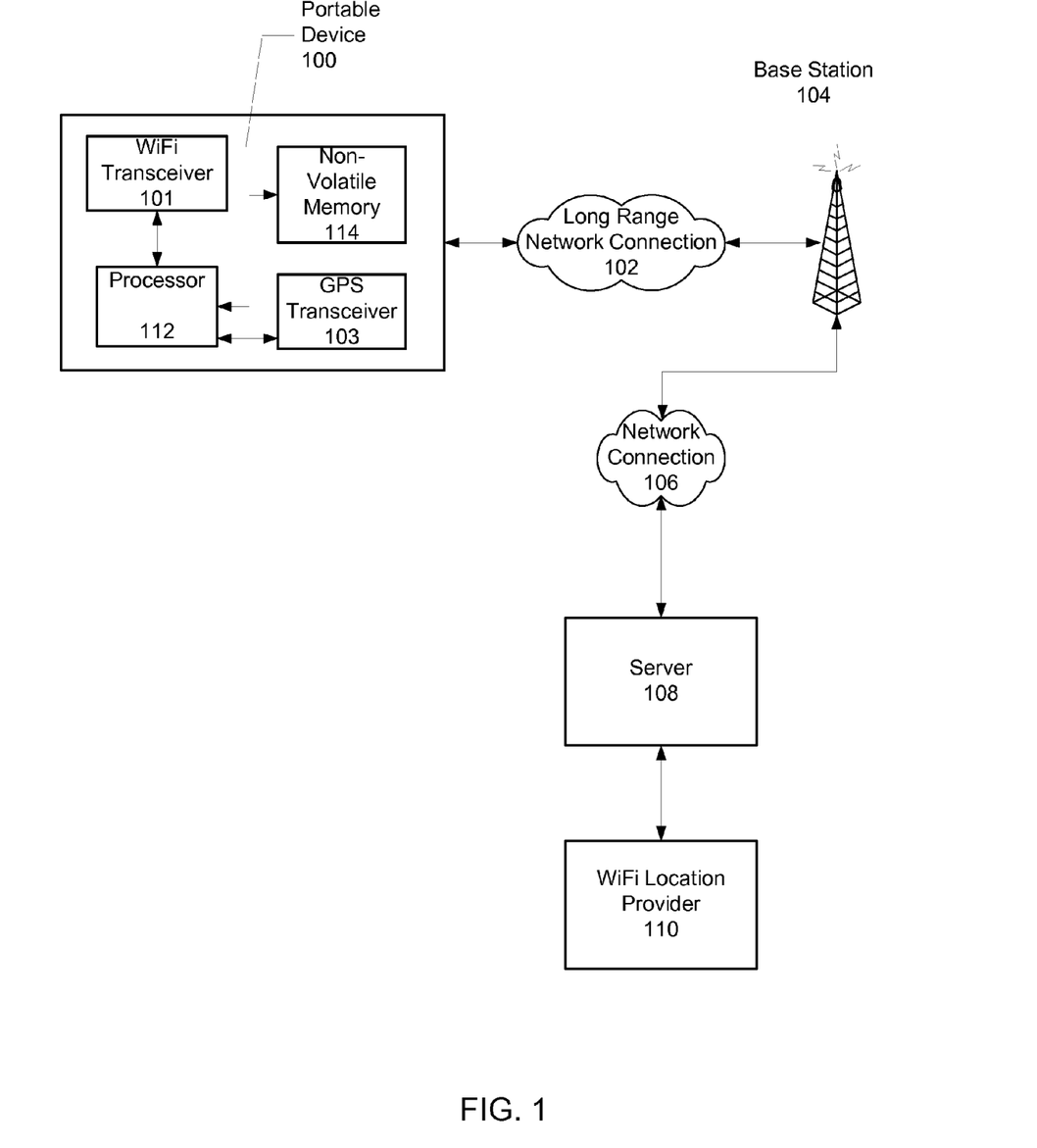
FIG. 1 illustrates an exemplary embodiment of a system for providing location-aware WiFi access for a portable device.

FIG. 1 illustrates an exemplary embodiment of a system for providing location-aware WiFi access for a portable device. The system can include a mobile device 100, a long-range network connection 102, a base station 104, a network connection 106, a server 108, and a Wifi location provider 110. The mobile device 100 may be any electronic device operative to provide voice and data services over a WiFi connection and that is able to obtain its own location (i.e., using GPS technology, cell tower triangulation, or another location-providing technology). The mobile device 100 may be generally any portable, mobile, or hand-held wireless electronic device that is operative as described above (e.g., a mobile telephone, a hand-held computer, and the like). The mobile device 100 can include WiFi transceiver 101, which can be used to communicate over a WiFi connection, and GPS transceiver 103, which can provide the location of the portable device 100. The WiFi transceiver 101 and the GPS transceiver 103 can be each coupled to a processor 112, which can be configured as described below. The mobile device 100 can also include a non-volatile memory 114, which can be used to store data on the mobile device 100 as described below.

The mobile device 100 can interact with the base station 104 through the long-range network connection 102. Long-range network connection 102 can be a network connection with range greater than a WiFi connection, and can be based upon a long range communications technology as described above (e.g., GSM, CDMA, EDGE, HSDPA and/or GPRS). Base station 104 can function as a transceiver, and can receive transmissions from the mobile device 100 and send transmissions to the mobile device 100 using long-range network connection 102. The base station 104 can be a base transceiver station in an exemplary embodiment used in mobile telephone communications.

The base station 104 can interact with the server 108 using the network connection 106. The network connection 106 can be implemented through the Internet, or any other type of public or private wired or wireless network. The server 108 can be in communication with WiFi location provider 110. In one embodiment, the WiFi location provider may be an application executed or accessed by server 108. In another embodiment, the WiFi location provider may be a web service. WiFi location provider 110 can include a database (not shown) that contains the locations and WiFi parameters for a plurality of WiFi access points, and, in an exemplary embodiment, is accessible using mobile phone standards (e.g., GSM or CDMA). The WiFi location provider 110 can, in an exemplary embodiment, be located on a separate server from the server 108 (e.g., on a server storing a web page that contains the database, or on a separate server on the same network as the server 108). Alternatively, the WiFi location provider 110 can be on the server 108.

The system described in FIG. 1 can provide location-aware WiFi access for the portable device 100. The location of the portable device 100 can be used to determine areas proximate to the portable device 100 where WiFi access is available. Location-aware WiFi access can be provided without manual intervention, and the WiFi transceiver 101 can be powered ON only when WiFi access is available, which can thereby avoid continuous scanning that can be wasteful in terms of power consumption.

Figure 2:
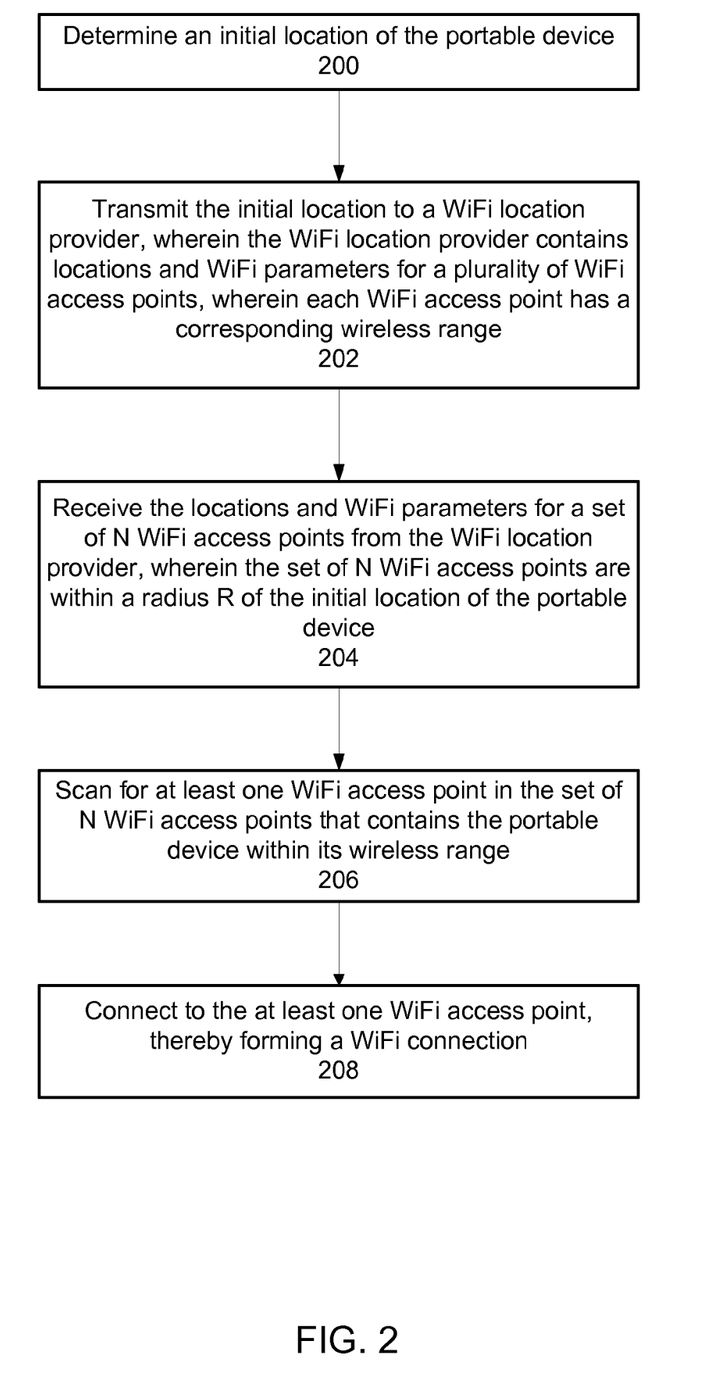
FIG. 2 illustrates an exemplary embodiment of a process for providing location-aware WiFi access for a portable device.

FIG. 2 illustrates an exemplary embodiment of a process for providing location-aware WiFi access for a portable device. The process may begin by determining an initial location of the portable device 100 (block 200). The initial location of the portable device 100 can be determined, for example, by using the GPS transceiver 103, or alternatively by using cell tower triangulation. The initial location of the portable device 100 may be represented by the coordinates $(x_{pd}, y_{pd}, z_{pd})$.

In an exemplary embodiment, the portable device 100 may receive an input requesting WiFi use. In one embodiment, the input requesting WiFi use can be input manually by a user using a graphic user interface for the portable device 100. This might be done, for example, when the user is aware that the portable device is located proximate to a WiFi access point, and would like to take advantage of the superior voice and/or data service that WiFi technology can provide. In another embodiment, the input requesting WiFi use can be automatically provided when the user requests to use voice and/or data services.

The initial location is transmitted to a WiFi location provider (e.g., WiFi location provider 110), wherein the WiFi location provider contains locations and WiFi parameters for a plurality of WiFi access points, wherein each WiFi access point has a corresponding wireless range (block 202). For example, the long-range network connection 102 can be used to transmit the portable device initial location $(x_{pd}, y_{pd}, z_{pd})$ to the base station 104. In an exemplary embodiment, the initial location can be sent to the base station 104 using a simple message service ("SMS") text message that is automatically generated (does not require the user to enter the coordinates). The portable device initial location $(x_{pd}, y_{pd}, z_{pd})$ can then be transferred to the server 108, which can access the WiFi location provider 110. Also, according to a further embodiment, the initial location can be transmitted to the WiFi location provider in response to the input requesting WiFi use.

The location for each WiFi access point within the WiFi location provider database can be expressed as coordinates in the form $(x_{ap-i}, y_{ap-i}, z_{ap-i})$, where "i" can refer to a unique string that identifies each WiFi access point. The wireless range can be a circle centered at the location for the WiFi access point $(x_{ap-i}, y_{ap-i}, z_{ap-i})$ with a radius $r_i$, which can be stored in the WiFi location provider in an exemplary embodiment. In another embodiment, the radius $r_i$ of all of the WiFi access points can be estimated to be a typical range (e.g., 50 meters, 100 meters, 500 meters, or any suitable range where effective data transmission can take place), instead of being stored in the WiFi location provider database.

WiFi parameters can include information needed for a portable device to establish a WiFi connection with a WiFi access point. For example, WiFi parameters contained within the WiFi location provider database can include at least one of the SSID, the channel number, the band, the security key, the country information element, and the quality of service parameters.

The locations and WiFi parameters are received for a set of N WiFi access points from the WiFi location provider, wherein the set of N WiFi access points are within a radius R of the initial location of the portable device (block 204). In an exemplary embodiment, this can be done by having the server 108 query the WiFi location provider for N WiFi access points most proximate to the portable device's initial location. N can be configurable to any predetermined number desired.

In an exemplary embodiment, the server 108 can, upon receiving the set of N WiFi access points, compute the radius R, which may correspond, for example, to the distance between the portable device 100 and the center of the farthest of the N WiFi access points. In an exemplary embodiment, R can be computed using the following formula:

$$R = \max(\text{square root}(x_{ap-i} - x_{pd})^2 + (y_{ap-i} - y_{pd})^2 + (z_{ap-i} - z_{pd})^2) \text{ for } 1 < i < N$$

Where ($x_{ap-i}$, $y_{ap-i}$, $z_{ap-i}$) are the coordinates of the $i^{th}$ WiFi access point and ($x_{pd}$, $y_{pd}$, $z_{pd}$) are the coordinates for the location of the portable device 100.

Figure 3:
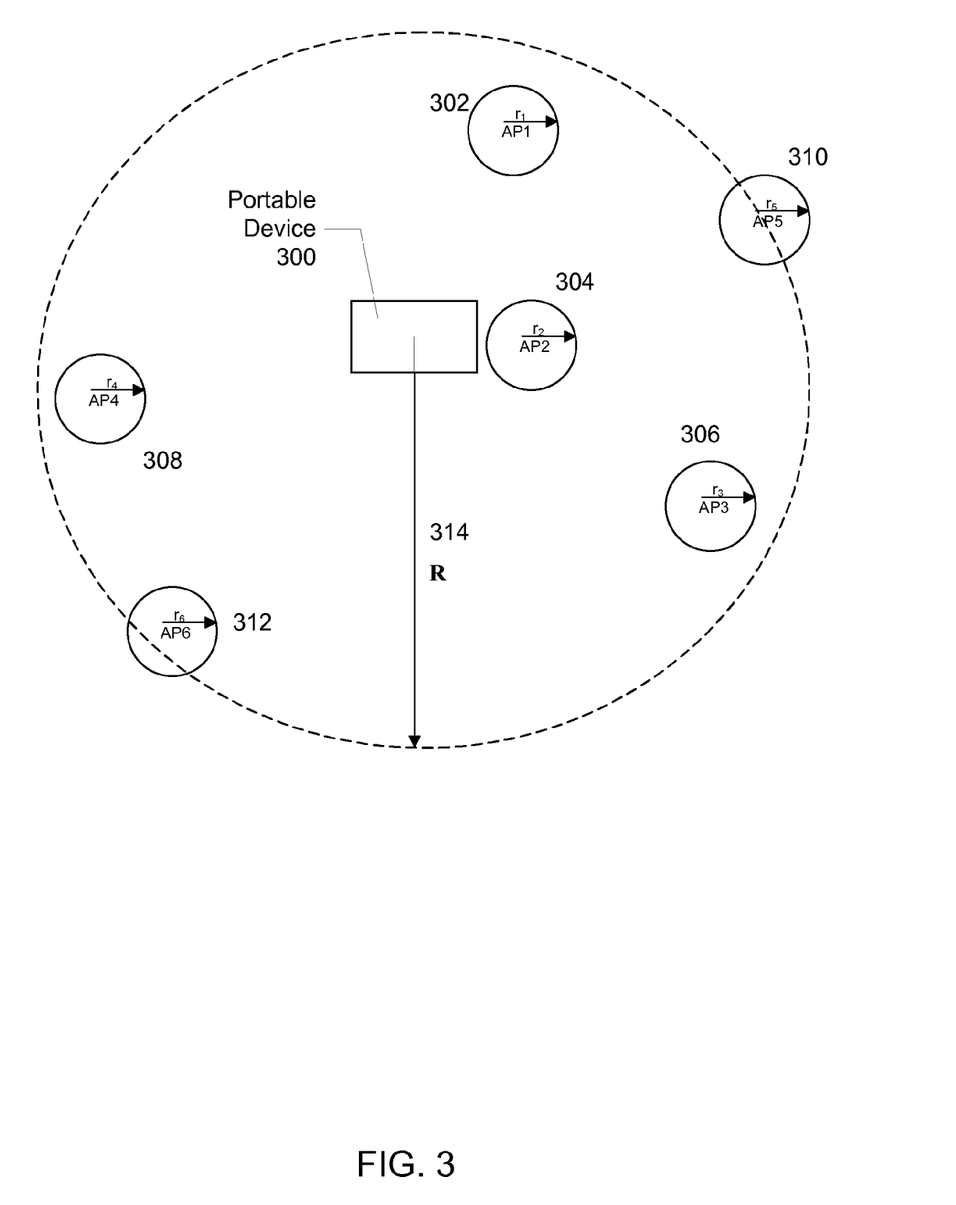
FIG. 3 illustrates an exemplary embodiment of a system for providing location-aware WiFi access for a portable device.

FIG. 3 illustrates an exemplary embodiment of a system for providing location-aware WiFi access for a portable device. FIG. 3 illustrates the set of N WiFi access points that are received by the portable device, for example.

In the system shown in FIG. 3, the server 108 returns to the portable device 300 the locations (in the form of coordinates) and WiFi parameters for a set of N=6 WiFi access points that are proximate to the portable device 300. Access points AP1 302, AP2 304, AP3 306, AP4 308, AP5 310, and AP6 312 have corresponding wireless ranges $r_1$, $r_2$, $r_3$, $r_4$, $r_5$, $r_6$ respectively, which can also be returned by the server 108. Radius R 314, also returned by the server 108 in the exemplary embodiment, is equal to the distance between the portable device 300 and the farthest access point AP5 310 within the set of returned access points. The locations, WiFi parameters, and wireless ranges of access points AP1 302, AP2 304, AP3 306, AP4 308, AP5 310, and AP6 312 and the radius R 314 can be sent to the portable device 300 using the long-range network connection 102, and in the exemplary embodiment can be sent using an SMS text message.

Referring again to FIG. 2, a scan is performed for at least one of the WiFi access points APT1 in the set of N WiFi access points that contains the portable device within its wireless range (block 206).

According to a further embodiment, in response receiving the locations and the WiFi parameters for the set of WiFi access points and prior to scanning, the portable device can selectively power ON the WiFi transceiver 101 when a current location of the portable device 100 falls within the wireless range of at least one of WiFi access point and when the portable device 100 is moving at a velocity less than a predetermined velocity V. To determine if the portable device 100 is moving less than the predetermined velocity V, the portable device 100 can utilize the GPS transceiver 103 in the exemplary embodiment. The threshold velocity V is configurable, and can be set, in an exemplary embodiment, to be an approximate of a user's walking speed of 2 meters/second. However, the threshold velocity V could also be set to be 2-4 meters/second, for example. For example, if the portable device 300 moved with a velocity less than V=2 meters/second and the portable device 300's location changed to be within the wireless range of access point APT2, then the WiFi transceiver of the portable device 300 would be powered ON. If the aforementioned conditions are not met, then the WiFi transceiver 101 would remain powered OFF, which can result in power savings.

In the case where the portable device 100 is within the wireless range of a single WiFi access point, the portable device can set the WiFi transceiver 101 to scan for the WiFi access point on the channel received from the WiFi location provider 110. In the case where the portable device 100 is within the wireless range of multiple WiFi access points, then logic can be utilized, in an exemplary embodiment, to prioritize the WiFi access points (e.g., scan for the access point most proximate to the portable device 100, scan for the access point with the highest data transfer rate, etc.). Once a WiFi access point has been selected, then the scan can be performed using the channel received from the WiFi location provider 110.

In an exemplary embodiment, the scanning for at least one of the N WiFi access points may be performed for a predetermined time T, after which the WiFi transceiver is turned OFF if a response is not received from at least one of the WiFi access points that contains the portable device within its wireless range. Failure to receive a response can be interpreted to mean that the WiFi access point or points that are being scanned for are non-existent and/or malfunctioning. In an exemplary embodiment, the failure to establish a WiFi connection can be communicated to the WiFi location provider 110, using an automatically generated and sent SMS text message, for example. Sending an SMS text message regarding the failure to establish a WiFi connection can be advantageous because sending the SMS text message can allow the WiFi location provider database to be updated, so future attempts to access a non-functioning WiFi access point can be avoided.

A connection is made to the at least one WiFi access point APT1, thereby forming a WiFi connection (block 208). In an exemplary embodiment, if the portable device 100 is within the wireless range of multiple WiFi access points, then logic can be used, as described above, to select a WiFi access point with which to form a connection. The WiFi connection can be used to take advantage of the potentially lower cost and higher throughput that WiFi technology can provide for voice and data services.

In an exemplary embodiment, the portable device 100 also contains a non-volatile memory 114, and a profile can be stored for the WiFi connection on the non-volatile memory, wherein the profile includes the location of the portable device at an initial time when the WiFi connection was formed and the WiFi parameters of the WiFi access point with which the WiFi connection was formed. The WiFi transceiver can be powered ON at a later time when the portable device is within a distance 2*d of the current location of the portable device at an initial time when the WiFi connection was formed, and automatically attempt to reconnect with the WiFi access point by using the WiFi parameters stored within the profile for the WiFi connection. The distance d is configurable, and can, for example, be the typical range of a WiFi access point, 100 meters. However, d can also be set to be any distance from 50 meters to 200 meters, for example.

By storing the profile for the WiFi connection on the portable device 100, the portable device 100 is able to reconnect with the WiFi access point at a later time without being required to receive the location and WiFi parameters for the WiFi access point from the WiFi location provider 110. This can be advantageous in terms of saving time and power consumption. Profiles can be stored on the portable device 100 not only for WiFi access points found using the WiFi location provider 110, but also for any other WiFi access point utilized by the portable device 100, including Wi-Fi access points where connections are established manually by a user or by using WiFi protected setup.

In an exemplary embodiment, a user of the portable device can be provided directions to change the current location of the portable device to a suggested location in order to improve the quality of the WiFi connection. The suggested location can be, for example, closer to the coordinates of the WiFi access point provided by the WiFi location provider 110. The user can be prompted for an input confirming that the user is in the suggested location before attempting to reconnect with the WiFi access point. This can be advantageous, as illustrated in FIG. 3. The user of portable device 300 could be instructed, using a graphical user interface, to move closer to the nearest WiFi access point AP2 304. The user could, upon moving into the wireless range of WiFi access point AP2 304, depress a button on the portable device 300, causing the portable device to attempt to reconnect with the WiFi access point AP2 304.

In an exemplary embodiment, the portable device 300 can refresh its WiFi access point records if the portable device 300 moves to a second location that is farther than the radius R from the initial location of the portable device 300. The portable device can then be provided with a new set of WiFi access points within a radius R2 from its second location.

The second location can be transmitted to the WiFi location provider 110, where the second location is a distance greater than the radius R from the initial location of the portable device, as described above. A set of N2 WiFi access points can be received from the WiFi location provider 110, where the set of N2 WiFi access points are within a radius R2 of the second location of the portable device.

The WiFi transceiver can then be powered ON when the portable device is moving at a velocity less than a predetermined velocity V and when the location of the portable device falls within the wireless range of at least one of the WiFi access points APT2 within the set of N2 WiFi access points. At least one of the WiFi access points APT2 that contains the portable device within its wireless range can be scanned for after selectively powering ON the WiFi transceiver. A connection can be made with one of the WiFi access points APT2 that contains the portable device within its wireless range, thereby forming a second WiFi connection, as described above.

A method and system for location-aware WiFi access for a portable device has been disclosed. The present invention is mainly described in terms of particular systems provided in particular implementations. However, this method and system may operate effectively in other implementations. For example, the systems, devices, and networks usable with the present invention can take a number of different forms. The present invention will also be described in the context of particular methods having certain steps. However, the method and system operate effectively for other methods having different and/or additional steps or steps in a different order not inconsistent with the present invention.

The present invention has been described in accordance with the embodiments shown, and there could be variations to the embodiments, and any variations would be within the scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made without departing from the scope of the appended claims.

We claim:

1. A method for providing location-aware WiFi access for a mobile communication device, the method comprising:

receiving, at the mobile communication device, one or more respective locations and one or more respective wireless ranges for a first set of one or more WiFi access points from a WiFi location provider system;

determining, at the mobile communication device, whether a current location of the mobile communication device is within one or more respective wireless ranges of one or more WiFi access points in the first set of one or more WiFi access points;

when it is determined that the current location of the mobile communication device is not within any wireless range of any of the WiFi access points in the first set, keeping a WiFi transceiver powered off;

when it is determined that the mobile communication device is moving at a velocity that meets a threshold, keeping the WiFi transceiver powered off;

when it is determined i) that the current location of the mobile communication device is within one or more respective wireless ranges of one or more respective WiFi access points in the first set, and ii) that the mobile communication device is moving at a velocity below the threshold, powering on the WiFi transceiver, and scanning, at the mobile communication device, for at least one WiFi access point in a second set of one or more WiFi access points, among the first set of one or more WiFi access points, within one or more respective wireless ranges of which the current location of the mobile communication device falls.

2. The method of claim 1, further comprising:

determining an initial location of the mobile communication device; and transmitting the initial location of the mobile communication device to the WiFi location provider.

3. The method of claim 2, wherein transmitting the initial location to the WiFi location provider comprises transmitting the initial location to the WiFi location provider in an SMS message, wherein the SMS message comprises coordinates of the mobile communication device.

4. The method of claim 2, wherein each WiFi access point included in the first set of one or more WiFi access points is within a particular radius of the initial location of the mobile communication device.

5. The method of claim 1, further comprising connecting, at the mobile communication device, to one of the WiFi access points in the second set of one or more WiFi access points to form a WiFi connection.

6. The method of claim 1, further comprising providing, with the mobile communication device, directions to a user of the mobile communication device to change the current location of the mobile communication device to a suggested location in order to improve quality of a WiFi connection.

7. The method of claim 1, wherein scanning for at least one WiFi access point in the second set of one or more WiFi access points is performed for a particular time period, after which the WiFi transceiver is turned OFF if a response is not received from at least one WiFi access point in the second set of one or more WiFi access points during the particular time period.

8. The method of claim 1, further comprising receiving, at the mobile communication device, one or more respective sets of WiFi parameters for the first set of one or more WiFi access points from the WiFi location provider system.

9. The method of claim 8, wherein each set of WiFi parameters comprises at least one of a respective SSID, a respective channel number, a respective band, a respective security key, a respective country information element, and respective quality of service parameters.

10. The method of claim 8, wherein scanning for at least one WiFi access point in the second set of one or more WiFi access points comprises using WiFi parameters in the one or more respective sets of WiFi parameters.

11. A method for providing location-aware WiFi access for a mobile communication device, the method comprising:
receiving, at the mobile communication device, one or more respective locations and one or more respective wireless ranges for a first set of one or more WiFi access points from a WiFi location provider system;
determining, at the mobile communication device, whether a current location of the mobile communication device is within one or more respective wireless ranges of one or more WiFi access points in the first set of one or more WiFi access points;
when it is determined i) that the current location of the mobile communication device is not within any wireless range of any of the WiFi access points in the first set, or ii) that the mobile communication device is moving at a velocity that meets a threshold, keeping a WiFi transceiver powered off;
when it is determined i) that the current location of the mobile communication device is within one or more respective wireless ranges of one or more respective WiFi access points in the first set, and ii) that the mobile communication device is moving at a velocity below the threshold,
powering on the WiFi transceiver, and
scanning, at the mobile communication device, for at least one WiFi access point in a second set of one or more WiFi access points, among the first set of one or more WiFi access points, within one or more respective wireless ranges of which the current location of the mobile communication device falls;
storing in a non-volatile memory WiFi parameters corresponding to the WiFi connection;
selectively powering on the WiFi transceiver at a later time when the mobile communication device is within a threshold distance of a location of the mobile communication device at a time when the WiFi connection was formed; and
after selectively powering on the WiFi transceiver, automatically attempting to reconnect with the one WiFi access point using the WiFi parameters corresponding to the WiFi connection stored in the non-volatile memory.

12. The method of claim 11, wherein:
storing the WiFi parameters corresponding to the WiFi connection is an element of storing a profile for the WiFi connection in the non-volatile memory; and
the profile comprises i) the location of the mobile communication device at the time when the WiFi connection was formed, and ii) the WiFi parameters corresponding to the WiFi connection.

13. A mobile communication device, comprising:
a WiFi transceiver; and
a processor, wherein the processor is configured to:
receive one or more respective locations and one or more respective wireless ranges for a first set of one or more WiFi access points from a WiFi location provider system,
determine whether a current location of the mobile communication device is within one or more respective wireless ranges of one or more WiFi access points in the first set of one or more WiFi access points,
when it is determined that the current location of the mobile communication device is not within any wireless range of any of the WiFi access points in the first set, keep the WiFi transceiver powered off,
when it is determined that the mobile communication device is moving at a velocity that meets a threshold, keep the WiFi transceiver powered off,
when it is determined i) that the current location of the mobile communication device is within one or more respective wireless ranges of one or more respective WiFi access points in the first set, and ii) that the mobile communication device is moving at a velocity below the threshold,
power on the WiFi transceiver, and
scan for at least one WiFi access point in a second set of one or more WiFi access points, among the first set of one or more WiFi access points, within one or more respective wireless ranges of which the current location of the mobile communication device falls.

14. The mobile communication device of claim 13, wherein the processor is further configured to:
determine an initial location of the mobile communication device; and
cause the initial location of the mobile communication device to be transmitted to the WiFi location provider.

15. The mobile communication device of claim 14, wherein the processor is further configured to cause the initial location to the WiFi location provider to be transmitted to the WiFi location provider in an SMS message, wherein the SMS message comprises coordinates of the mobile communication device.

16. The mobile communication device of claim 14, wherein each WiFi access point included in the first set of one or more WiFi access points is within a particular radius of the initial location of the mobile communication device.

17. The mobile communication device of claim 13, wherein the processor is further configured to cause the mobile communication device to form a WiFi connection with one of the WiFi access points in the second set of one or more WiFi access points.

18. The mobile communication device of claim 13, wherein the processor is configured to provide directions to a user of the mobile communication device to change the current location of the mobile communication device to a suggested location in order to improve quality of a WiFi connection.

19. The mobile communication device of claim 13, wherein the processor is configured to:
scan for at least one WiFi access point in the second set of one or more WiFi access points for a particular time period, and
after scanning for the particular time period, turn off the WiFi transceiver if a response is not received from at least one WiFi access point in the second set of one or more WiFi access points during the particular time period.

20. The mobile communication device of claim 13, wherein the processor is configured to:
receive one or more respective sets of WiFi parameters for the first set of one or more WiFi access points from the WiFi location provider system; and scan for at least one WiFi access point in the second set of one or more WiFi access points using WiFi parameters in the one or more respective sets of WiFi parameters.

21. A mobile communication device, comprising;
a WiFi transceiver;
a non-volatile memory; and
a processor coupled to the non-volatile memory, wherein the processor is configured to:
receive one or more respective locations and one or more respective wireless ranges for a first set of one or more WiFi access points from a WiFi location provider system,
determine whether a current location of the mobile communication device is within one or more respective wireless ranges of one or more WiFi access points in the first set of one or more WiFi access points,
when it is determined i) that the current location of the mobile communication device is not within any wireless range of any of the WiFi access points in the first set, or ii) that the mobile communication device is moving at a velocity that meets a threshold, keep the WiFi transceiver powered off,
when it is determined i) that the current location of the mobile communication device is within one or more respective wireless ranges of one or more respective WiFi access points in the first set, and ii) that the mobile communication device is moving at a velocity below the threshold,
power on the WiFi transceiver, and
scan for at least one WiFi access point in a second set of one or more WiFi access points, among the first set of one or more WiFi access points, within one or more respective wireless ranges of which the current location of the mobile communication device falls:
wherein the processor is further configured to:
store WiFi parameters corresponding to the WiFi connection in the non-volatile memory,
selectively power on the WiFi transceiver at a later time when the mobile communication device is within a threshold distance of a location of the mobile communication device at a time when the WiFi connection was formed, and
after selectively powering on the WiFi transceiver, automatically cause the mobile communication device to attempt to reconnect with the one WiFi access point using the WiFi parameters corresponding to the WiFi connection stored in the non-volatile memory.

22. The mobile communication device of claim 21, wherein:
the processor is configured to store the WiFi parameters corresponding to the WiFi connection as part of a profile for the WiFi connection stored in the non-volatile memory; and
the profile comprises i) the location of the mobile communication device at the time when the WiFi connection was formed, and ii) the WiFi parameters corresponding to the WiFi connection.

23. A tangible, non-transitory memory storing machine readable instructions that, when executed by a processor of a mobile communication device, cause the processor to:
receive one or more respective locations and one or more respective wireless ranges for a first set of one or more WiFi access points from a WiFi location provider system;
determine whether a current location of the mobile communication device is within one or more respective wireless ranges of one or more WiFi access points in the first set of one or more WiFi access points;
when it is determined that the current location of the mobile communication device is not within any wireless range of any of the WiFi access points in the first set, keep a WiFi transceiver of the mobile communication device powered off;
when it is determined that the mobile communication device is moving at a velocity that meets a threshold, keep the WiFi transceiver of the mobile communication device powered off;
when it is determined i) that the current location of the mobile communication device is within one or more respective wireless ranges of one or more respective WiFi access points in the first set, and ii) that the mobile communication device is moving at a velocity below the threshold,
power on the WiFi transceiver of the mobile communication device , and
cause the mobile communication device to scan for at least one WiFi access point in a second set of one or more WiFi access points, among the first set of one or more WiFi access points, within one or more respective wireless ranges of which the current location of the mobile communication device falls.

24. The tangible, non-transitory memory of claim 23, storing machine readable instructions that, when executed by a processor, cause the processor to:
determine an initial location of the mobile communication device; and
cause the initial location of the mobile communication device to be transmitted to the WiFi location provider.

25. The tangible, non-transitory memory of claim 24, wherein each WiFi access point included in the first set of one or more WiFi access points is within a particular radius of the initial location of the mobile communication device.

26. The tangible, non-transitory memory of claim 23, storing machine readable instructions that, when executed by a processor, cause the processor to:
provide directions to a user of the mobile communication device to change the current location of the mobile communication device to a suggested location in order to improve quality of a WiFi connection.

27. The tangible, non-transitory memory of claim 23, storing machine readable instructions that, when executed by a processor, cause the processor to:
scan for at least one WiFi access point in the second set of one or more WiFi access points for a particular time period; and
after scanning for the particular time period, turn off the WiFi transceiver if a response is not received from at least one WiFi access point in the second set of one or more WiFi access points during the particular time period.

28. The tangible, non-transitory memory of claim 23, storing machine readable instructions that, when executed by a processor, cause the processor to:
receive one or more respective sets of WiFi parameters for the first set of one or more WiFi access points from the WiFi location provider system; and
scan for at least one WiFi access point in the second set of one or more WiFi access point using WiFi parameters on the one or more respective sets of WiFi parameters.

29. A tangible, non-transitory memory storing machine readable instructions that, when executed by a processor of a mobile communication device, cause the processor to:

receive one or more respective locations and one or more respective wireless ranges for a first set of one or more WiFi access points from a WiFi location provider system;
determine whether a current location of the mobile communication device is within one or more respective wireless ranges of one or more WiFi access points in the first set of one or more WiFi access points;
when it is determined i) that the current location of the mobile communication device is not within any wireless range of any of the WiFi access points in the first set, or ii) that the mobile communication device is moving at a velocity that meets a threshold, keep a WiFi transceiver of the mobile communication device powered off;
when it is determined i) that the current location of the mobile communication device is within one or more respective wireless ranges of one or more respective WiFi access points in the first set, and ii) that the mobile communication device is moving at a velocity below the threshold,
power on the WiFi transceiver, and
cause the mobile communication device to scan for at least one WiFi access point in a second set of one or more WiFi access points, among the first set of one or more WiFi access points, within one or more respective wireless ranges of which the current location of the mobile communication device falls;
cause the mobile communication device to connect to one of the WiFi access points in the second set of one or more WiFi access points to form a WiFi connection;
store in a non-volatile memory WiFi parameters corresponding to the WiFi connection;
selectively power on the WiFi transceiver at a later time when the mobile communication device is within a threshold distance of a location of the mobile communication device at a time when the WiFi connection was formed; and
after selectively powering on the WiFi transceiver, automatically attempt to reconnect with the one WiFi access point using the WiFi parameters corresponding to the WiFi connection stored in the non-volatile memory.

\* \* \* \* \*